United States Patent [19]

Tucker

[11] 4,211,051
[45] Jul. 8, 1980

[54] CUT-OFF DEVICE FOR CHUB MACHINES

[75] Inventor: Phillip C. Tucker, Bettendorf, Iowa

[73] Assignee: The Kartridg Pak Co.

[21] Appl. No.: 870,606

[22] Filed: Jan. 19, 1978

[51] Int. Cl.² .......................... B65B 51/04; B65B 9/06
[52] U.S. Cl. ..................... 53/138 A; 53/551
[58] Field of Search ................. 53/138 A, 551, 554, 53/417, 451, 550, 553; 74/54

[56] References Cited

U.S. PATENT DOCUMENTS

| 2,257,823 | 10/1941 | Stokes | 53/551 |
| 2,712,824 | 7/1955 | Steiner | 53/138 A |
| 2,784,540 | 3/1957 | Jarund | 53/551 |
| 2,831,302 | 4/1958 | Jensen et al. | 53/552 |
| 3,149,447 | 9/1964 | Dorr | 53/551 |
| 3,206,345 | 9/1965 | Stickel | 53/553 |
| 3,780,491 | 12/1973 | Robinson | 53/226 |
| 3,992,854 | 11/1976 | Howell et al. | 53/451 |

*Primary Examiner*—John Sipos
*Attorney, Agent, or Firm*—Lockwood, Dewey, Alex and Cummings

[57] ABSTRACT

The chub packaging machine, or the like, in which the package cutting device or severing mechanism is spaced from the clip applying closure head and operable in coordination therewith. The cutting device or severing mechanism is separately mounted or carried on a positioning device which is operatively interconnected with the drive mechanism of the machine so as to operate in coordination with the clip applying closure head.

4 Claims, 10 Drawing Figures

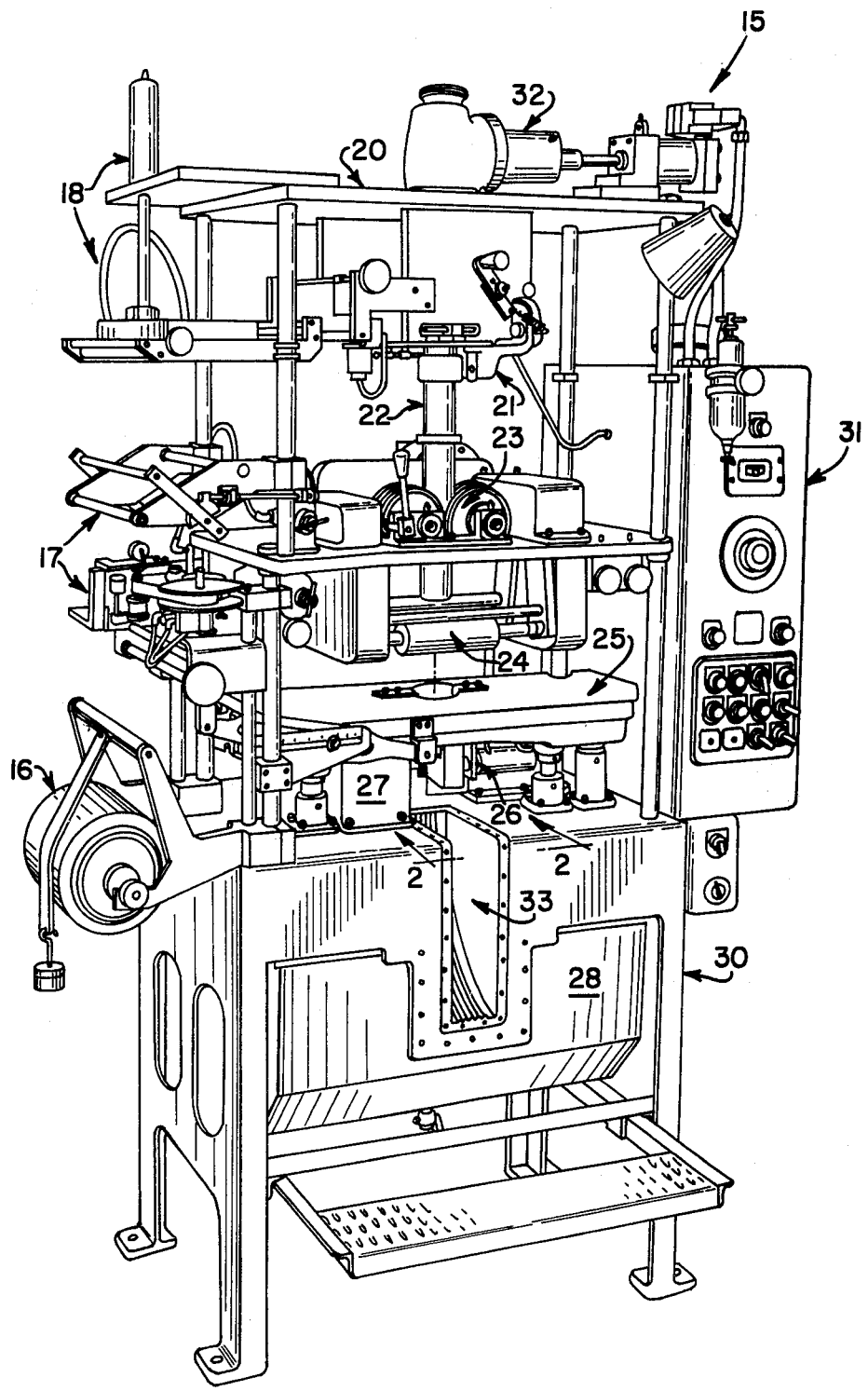
FIG_1

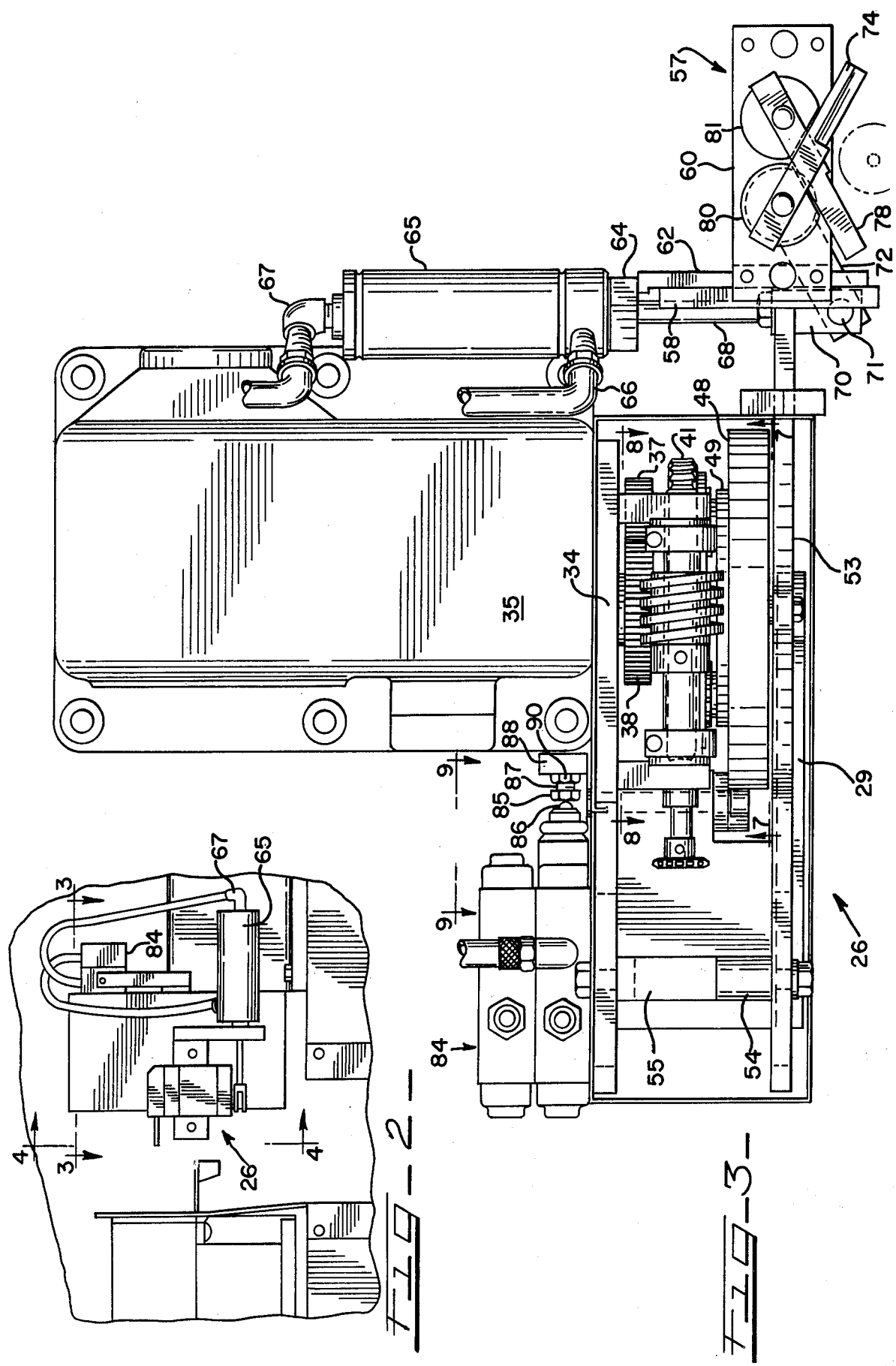

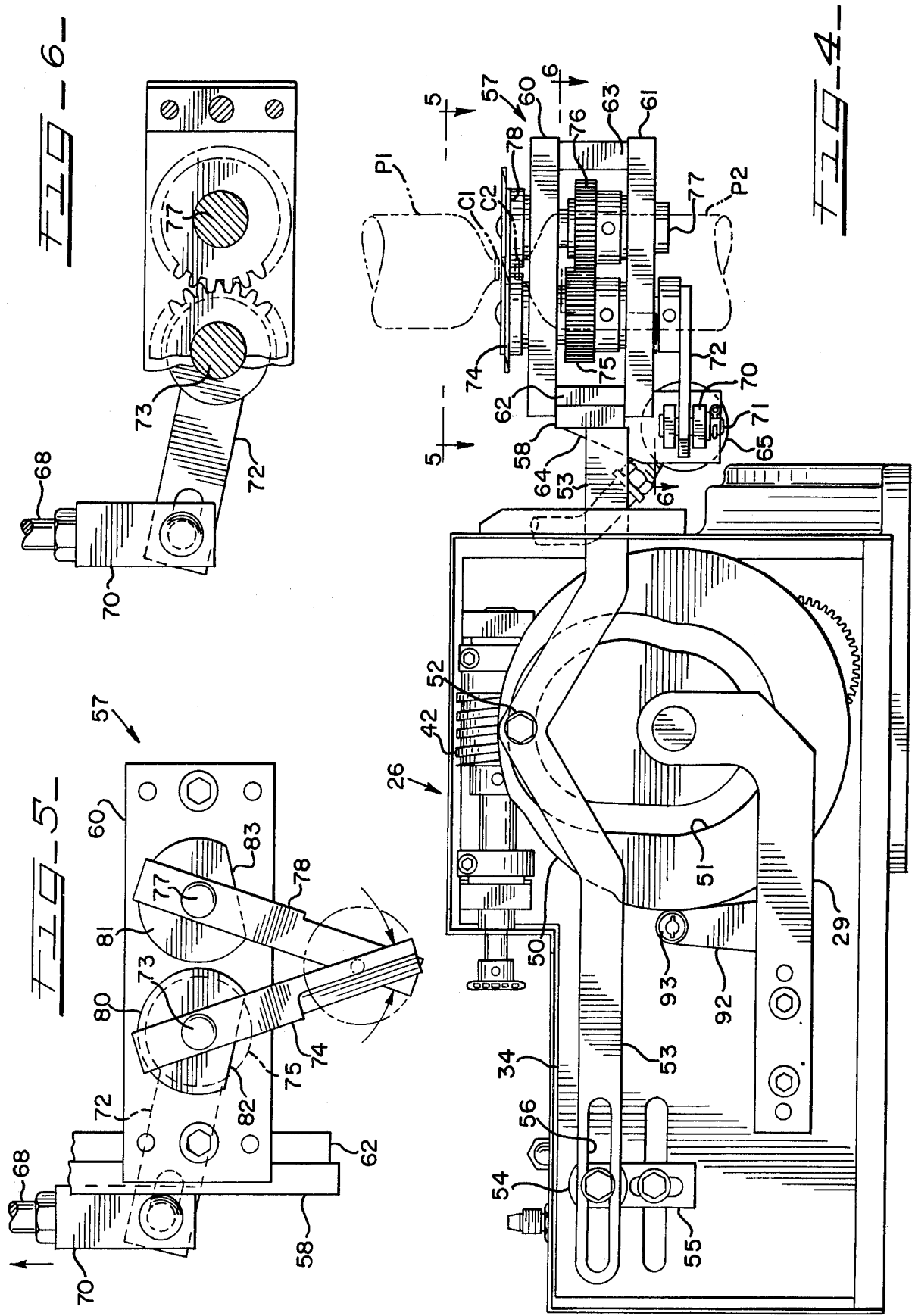

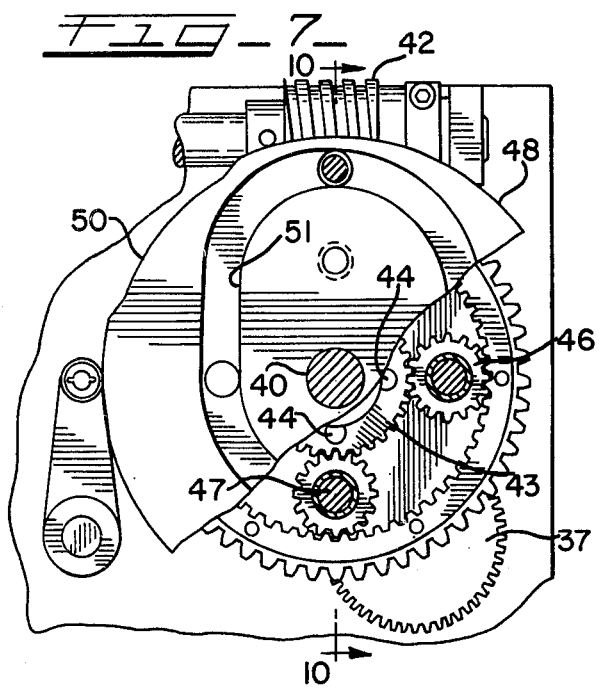
FIG_7_
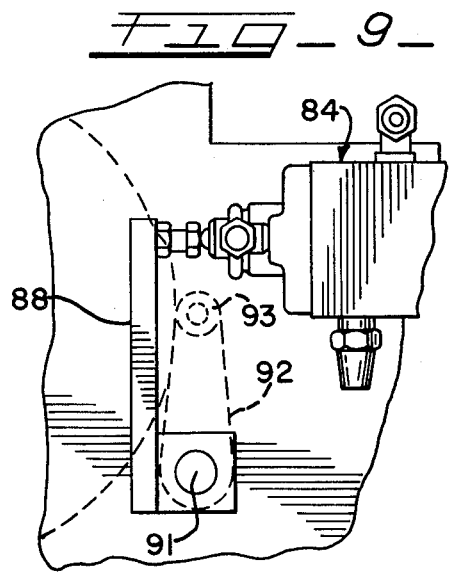
FIG_9_
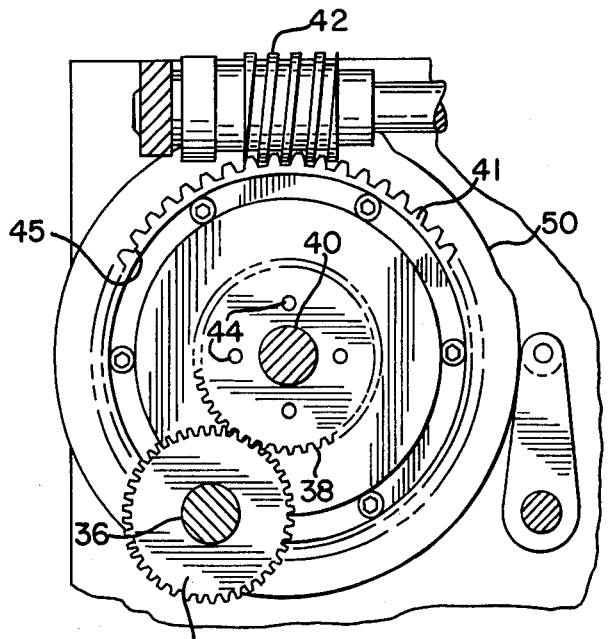
FIG_8_
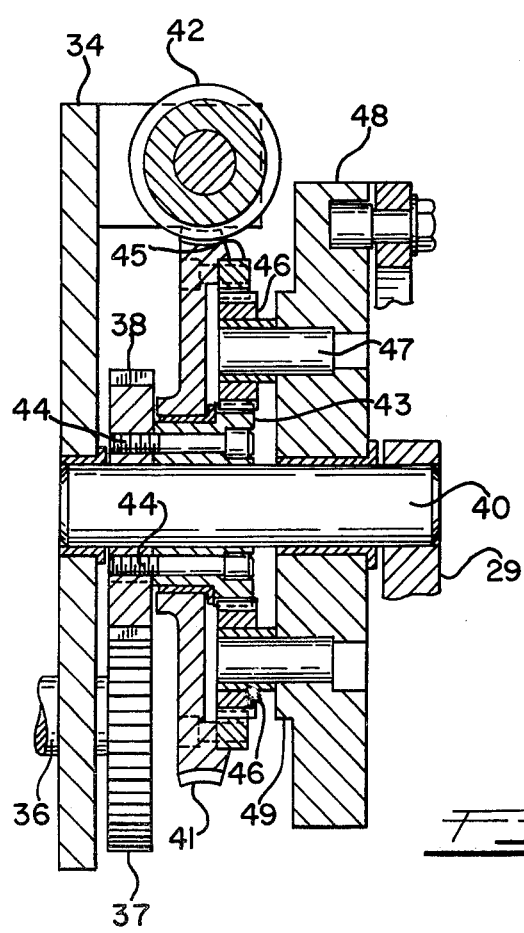
FIG_10_

CUT-OFF DEVICE FOR CHUB MACHINES

This invention relates, generally, to innovations and improvements in package forming machines such as the chub machine. U.S. Pat. No. 2,831,302 dated Apr. 22, 1958 discloses an early form of the chub machine. Various improvements on the original machine form the subject matter of U.S. Pat. Nos. 3,149,447 dated Sept. 22, 1964, 3,324,621 dated June 13, 1967, 3,795,083 dated Mar. 5, 1974 and 3,992,854 dated Nov. 23, 1976. Chub packaging machines have been commercially available for a number of years from The Kartridg Pak Co. of Davenport, Iowa. These machines are in wide use and are described in considerable detail in printed service manuals.

Prior to the present invention, chub machines have incorporated so-called closure heads which oscillate or reciprocate between upper and lower positions and perform three functions. One function is to gather, squeeze of constrict a short length of tubing from which product will usually have been "voided" (i.e. displaced). A second function is to apply a pair of closure clips to each relatively short gathered length of voided tubing with the clips being spaced sufficiently to permit severing of the gathered material between the clips. The third function is to cut or sever the gathered tubing between the clips thereby separating the formed chub packages from those being formed upstream.

The chub machines heretofore available have been used successfully to package a wide variety of products, both edible and inedible. Among the edible products, chub machines have been widely used to package such items as liver sausage, cheese, cookie dough, ground meat, etc. The chub machines have also been used to package a variety of inedible products such as explosives, adhesives in one or two compartments, etc. In general, chub packaging machines can be used to package any material which is flowable or extrudable.

In prior chub packaging machines, a critical part has been the closure head, which is a relatively complex mechanism and in which the above-mentioned three separate operations are performed, i.e. gathering or squeezing a short length of the tubing thereby keeping and/or displacing product therefrom, applying pairs of relatively closely spaced closure clips to the gathered tubing, and cutting or severing the gathered tubing intermediate the clips.

As a practical matter, when a short length of tubing is gathered from which product has been voided or displaced, it is not practical to completely displace or expel all product. Accordingly, when the cutting knives sever or cut the gathered tubing intermediate a pair of clips, there is some appreciable contact between the blades and the residual product in the gathered length of tubing intermediate the clips. Depending upon the product being packaged, this contact between blade and product which occurs in the operation of prior chub machines has given rise to disadvantages or problems of varying magnitude including one or more of the following:

1. Closure heads bind or jam due to accumulation of product which occupies the running clearances of the head;
2. Closure heads deform and produce unreliable closures because of part fit deterioration resulting from binding and jamming over a period of time;
3. Excessive closure head parts wear due to abrasiveness of product;
4. Frequent shutdown in order to clean the head parts and remove product; and
5. Shortened closure head parts life caused by corrosive effects of product.

The improvement provided by the present invention permits the removal and relocation of the cutting or severing mechanism previously incorporated in the closure heads of chub machines. The relocation is such that the cutting device or severing mechanism operates in coordination with the clip applying closure head but downstream therefrom. The knives are the only parts that contact both the package and the product. However, since the knives are self-sharpening and self-cleaning, they are not significantly degraded (i.e. worn or corroded). By means of this improvement, the above-mentioned disadvantages and problems associated with the closure heads of prior chub machines are overcome or eliminated.

The object of the invention, generally stated, is to remove or eliminate the cutter or severing mechanism from the reciprocating, clip-applying, closure head of a chub or similar packaging machine and relocate such cutter device or severing mechanism downstream of the closure head and to have the cutter device or severing mechanism operate in coordination therewith.

Certain more specific objects and several advantages of the present invention will become apparent from the following detailed description of a presently preferred embodiment thereof taken in conjunction with the accompanying drawings, wherein:

FIG. 1 is a prespective view of a chub packaging machine in which the improvement of the present invention has been incorporated;

FIG. 2 is a segmental elevational view taken generally on line 2—2 of FIG. 1 showing the cutting device or package severing mechanism of the present invention;

FIG. 3 is a top plan view on enlarged scale taken on line 3—3 of FIG. 2 of the cutter device or package severing mechanism;

FIG. 4 is an elevational view taken on line 4—4 of FIG. 2 showing the cutter device or package severing mechanism and portions of two packages in broken line in position to be severed from each other;

FIG. 5 is a detail plan view taken on line 5—5 of FIG. 4;

FIG. 6 is a detail view, partly broken away taken on line 6—6 of FIG. 4;

FIG. 7 is a fragmentary elevational view partly broken away taken on line 7—7 of FIG. 3;

FIG. 8 is a fragmentary elevational view taken on line 8—8 of FIG. 3;

FIG. 9 is a fragmentary detail elevational view taken on line 9—9 of FIG. 3; and FIG. 10 is a sectional view on line 10—10 of FIG. 7.

Referring to FIG. 1, the particular packaging machine shown therein is a chub packaging machine, Model 43, commercially available from The Kartridg Pak Co., Davenport, Iowa in which one embodiment of the present invention has been incorporated. The machine is indicated generally at 15 and, as will be readily recognized by those familiar with chub machines, it has a film arbor 16, a pricer dater 17, a thermo conditioner 18, a canopy 20, a tube seam overlap sealer 21, a mandrel 22, a film drive 23, a voider 24, a closure head 25, a cutter device or severing mechanism 26, a wire cut-off mechanism 27 and mechanical drive 28. All of the foregoing sub-assemblies or components are suitably mounted on the frame of the machine which is indicated generally at 30. Also mounted thereon is the electrical cabinet with control panel indicated at 31 and a product piston 32. The wire-feeding mechanism (not shown) is on the rear of the machine and not shown in FIG. 1. As disclosed, for example, in the above identified U.S. Pat. No. 3,831,302, and as is well known in commercial chub machines, the various above-mentioned subassemblies and components are driven and operated in time interconnected relationship from a suitable power source such as, for example, the motor 64 and speed reducer 60 in U.S. Pat. No. 2,831,302.

As is well-known to those familiar with the chub machines, a web of packaging film is continuously withdrawn from the arbor 16 when the machine is in operation. The web is led upwardly over the pricer dater 17, through the thermo conditioner 18 and thence to the film folder. In the film folder the side edges of the film are overlapped with the film being formed into a tube surrounding the upper portion of the mandrel 22. The sealer 21 acts to heat seal or otherwise bond the overlapped edges thereby completing the formation of a continuous tube. The film drive 23 engages the exterior of the tube and serves to continuously feed the tube downwardly. Below the film drive mechanism 23 the tube receives a metered quantity of flowable product through the mandrel 22. On passing through the voider 24 the voider rolls, at predetermined intervals, momentarily swing inwardly together compressing the product-filled tube and thereby voiding or expelling product from the portion of the tube which is flattened or compressed. Each voided length of tube is gathered and has a pair of clips applied as it passes downwardly with the reciprocating closure head 25.

On leaving the closure head 25, the string of clipped packages passes downwardly past the cutter device 26 which, on actuation, severs the gathered tubing between pairs of clips. Thereupon, each cut off package falls into the discharge chute 33 to be collected in a suitable container or fall onto a conveyor belt.

In operation the closure head 25 reciprocates between lower and upper positions under the control of a cam drive. During the downward travel of the closure head, when its downward velocity matches the film feed and therefore there is no appreciable movement between the head and the tubing, the closure head operates to gather the film where it has been voided and apply a pair of spaced clips. Heretofore, in prior club machines the closure head 25 has also incorporated a cutter device or severing mechanism which operates to sever the packaging material intermediate the clips thereby separating the lowermost package from the oncoming packages being formed. In the present machine the cutter device or severing mechanism has been eliminated from the closure head 25 and a new form of cutter device or severing mechanism 26 is separately mounted below (i.e. downstream) of the closure head 25.

Referring to FIGS. 2, 3 and 4, the mounting plate weldment 34 for the cutter device 26 is stationarily mounted on the voider gear box 35 in a suitable manner. The drive shaft 36 (FIG. 8) for the cutter device 26 is an extension of the drive shaft in the voider gear box 35 of the chub machine 15. As disclosed, for example, in the previously mentioned U.S. Pat. No. 2,831,302 to Jensen et al., and as is well known in commercial chub machines, the voider 24 and the closure head 25 are driven and operated in timed relationship from the same power source, e.g., motor 64 and speed reducer 60 in U.S. Pat. No. 831,302. Accordingly, the cutter device 26 has a positive drive connection to the packaging machine 15 so that operation of the cutter device is coordinated with the operation of the closure head 25. A spur gear 37 (FIGS. 3, 4, 7, 8 and 10) is keyed to the shaft 36 and drives a spur gear 38 journaled on a shaft 40 supported at its inner end by the vertical mounting plate of the weldment 34 and at its front end on the upwardly extending end of a bracket arm 29.

From the front of the machine 15, as viewed in FIGS. 1, 2 and 4, the spur gear 38 rotates at the back side of a normally stationary worm gear 41 which is, from time to time, adjusted by rotation of a worm 42, as will be explained below. The worm gear 41 is rotatably mounted on the rearwardly projecting hub of a sun gear 43 (FIG. 7) rotatable on the shaft 40. The drive gear 38 is secured by four screws 44—44 to the hub of the sun gear 43 whereby the sun gear 43 is also driven with the gear 38.

An internal ring gear 45 is secured to the front side of the worm gear 41 and has meshing engagement with four planet gears 46—46 rotatably mounted on pins 47—47 which project rearwardly from a planet carrier formation 49 (FIG. 3) on the back side of a motion generating cam plate 48. The motion generating cam plate 48 is cylindrical except for a dwell 50 and has a cam groove 51 formed in the front side thereof.

From the foregoing, it will be seen that the spur gear 37 is driven from the shaft 36 extended from the voider gear box 35 and thereby drives the spur gear 38 and in turn the sun gear 43. The sun gear 43 meshes with the planet gears 46 which also mesh with the normally stationary internal gear 45 mounted on the worm gear 41. Since the planet gears 46 are carried by the motion generating cam plate 48 the sun gear 43 serves to drive the motion generating cam plate 48 through the planet gears 46.

The cam groove 51 in the motion generating cam plate 48 serves to actuate a cam follower 52 laterally projecting from a pivoting arm 53. The pivoting arm 53 is clamped to the front side of a sleeve bearing 54 which is carried by a block 55 which is vertically adjustable on the support plate 34. The arm 53 has a slot 56 in its pivoted end which allows it to be laterally adjusted on the sleeve bearing 54. On its opposite or non-pivoted end, the arm 53 supports a cutter knife head 57. For this purpose, the end of the arm 53 has welded or otherwise secured at right angles thereto a support member 58 which in turn supports the frame for the knife head 57. The frame consists of spaced upper and lower plates 60 and 61, respectively and vertical side members 62 and 63.

The member 62 extends rearwardly and at its rear end has welded or otherwise secured thereto a vertical support member 64 on which is mounted a double acting cylinder 65 having hydraulic connections 66 and 67 at opposite ends thereof. The piston rod 68 of the cylinder 65 carries a bifurcated fitting 70 on its outer end through which extends a vertical pin 71. A crank arm 72 fits between the upper and lower bifurcated arms of the fitting 70 and is apertured so that the pin 71 extends therethrough. The opposite end of the crank arm 72 is rigidly secured to the bottom end of a vertical shaft 73 extending from underneath the bottom plate 61 to above the upper plate 60. At its upper end the shaft 73 has secured thereto a knife blade 74. Intermediate the plates 60 and 61 the shaft 73 also has secured thereto a spur gear 75. The spur gear 75 meshes with another spur gear 76 carried on a vertical shaft 77 extending through plates 60 and 61 and which has secured to the upper end thereof above the plate 60, a knife 78.

The mounted end of each knife 74 and 78 is secured to a cylindrical block 80 and 81, respectively, which in turn are secured to the upper end of the shafts 73 and 77, respectively. Each of the blocks 80 and 81 has a flat side 82 and 83, respectively (FIG. 5). When the knives 74 and 78 are in their non-cutting or retracted position (FIG. 3) blade 74 fits against the flat 83 and blade 78 fits against flat 82, thereby preventing further rotation of the blades in a retracting direction.

Preferably, a coil spring (not shown) surrounds vertical shaft 77 intermediate the plates 60 and 61 so as to bias or press the blade 78 carried thereon upwardly against the underside of the blade 74. The blades 74 and 78 are mounted in such a way that the cutting edge of each is tipped approximately 2° from the horizontal so that the cutting edges are maintained sharp by the abrasion of their sliding contact. The spring loading of the shaft 77 of the lower knife 78 maintains this sliding contact.

From FIGS. 3 and 5, it will be seen that when the piston rod 68 is extended (FIG. 3) the blades 74 and 78 are in their retracted non-cutting and non-severing position. When the piston rod 68 is retracted into the double acting cylinder 65 the blades will be rotated through cutting engagement and into their position indicated in FIG. 5. Control for the double acting cylinder 65 which actuates the knife cutting mechanism 57 is provided by a four-way mechanically operated air control vavle indicated generally at 84 (FIGS. 2, 3 and 9). The valve 84 is mounted on the back side of the support plate weldment 34. This valve may be of known commercial type such as a Rex Hanna "Omni" valve. The valve 84 is actuated by the periodic engagement of the head 85 of an adjustable screw 87 (FIG. 3) against a spring loaded actuating button 86. The screw 87 is carried on the upper end of a valve actuating arm 88. A jam nut 90 secures the screw 87 in any particular adjusted position.

At its lower end the valve actuating arm 88 is mounted on the rear end of a rocker shaft 91 (FIG. 9) which extends through the main vertical support plate of the weldment 34. At its forward end the rocker shaft 91 carries a normally upright cam carrying arm 92 (FIG. 4) which carries a cam follower 93 on its upper end. The cam follower 93 rolls against the periphery of the cam plate 48. The screw 87 is adjusted so that normally the roller cam 93 will maintain the valve actuating button 86 in its inner depressed position. However, as cam follower 93 passes over the dwell 50, the button 86 is allowed to extend and the double acting cylinder 65 is actuated causing the knife blades 74 and 78 to pass through their cutting position and thereby sever the gathered tubing material intermediate the spaced clips $C_1$, $C_2$ (FIG. 4). When the can follower 93 rides up from the dwell 50 to the full circumference of the cam plate, the actuating button 86 will again be depressed and the blades 74 and 78 returned to their retracted position as shown in FIG. 3.

It will be seen from FIG. 4 that the cam follower 52 carried on the pivot pin arm 53 follows the cam groove 51 in the motion generating cam plate 48. This causes the pivot arm 53 to swing in a vertical plane as it pivots on the sleeve pushing 54. The geometry of the cam groove 51 is such that in combination with the length of the arm 53 the oscillating motion imparted to the knife mechanism or cutting device 57 is essentially linear. From its uppermost position, the initial downward acceleration of the arm 53 and the cutting device 57 is followed by a substantially constant downward velocity followed in turn by a downward deceleration, a dwell, an upward acceleration, and upward deceleration back to its uppermost starting point. The constant downward velocity of the cutting head 57 is made to match the downward discharge velocity of the package stream produced by the packaging machine 15 and represented in FIG. 4 by the upper and lower chub packages $P_1$ and $P_2$, respectively. It is during this coordinated or synchronized time period that the cutting device 57 is actuated by the double acting cylinder 65 so as to sever the packaging material interconnecting the packages $P_1$ and $P_2$ in between the clips $C_1$ and $C_2$. During this matched velocity time or period, the blades 74 and 78 are also returned to their retracted position wherein they have clearance with respect to the package stream.

It will be seen from FIG. 4 that the effective overall length of the pivot arm 53 can be adjusted by shifting the arm to the left or right on the sleeve bearing 54 as permitted by the slot 56. A lengthening of the distance from the pivot axis to the cam follower 52 decreases the downward velocity and the amplitude of the motion of the cutting device 57. Conversely, shortening of the distance will, of course, have the opposite effect. Raising or lowering the pivot axis by adjustment of the block 55 produces an inverse effect on the cutting device. These adjustments enable the vertical start position and the downward velocity of the knife mechanism 57 to be changed thereby enabling, and providing, functional compliance with a wide range of settings of the packaging machine 15.

Another adjustment of the cutting device or severing mechanism 26 is provided by rotating the worm 42 which in turn rotates the worm gear 41 in one direction or the other, and likewise the internal ring gear 45. As a result, the angular relationship of the input drive gear 37 with respect to the planet gear carrier and the motion imparting cam plate 48 is changed. Since the input gear 37 is driven by the packaging machine drive train, this angular relationship change affects the registration of the motion of the knife head 57 with the boundaries of the packages $P_1$ and $P_2$. It will be understood that if desired the adjustment of the worm 42 can be arranged to be remotely controlled from the front panel. It is significant that the adjustment provided by the worm gear 42 can be made while the packaging machine 15 is running and has the effect of changing the location of the package severance with respect to the package boundaries.

A remote on-off air switch (not shown) may be used to provide pilot air control to a pilot-operated valve that is placed between the main control valve 84 and the double acting cylinder 65. Such a pilot operated valve can, by command of the on-off air switch, disable the functioning of the knife head 57 without interfering with the knife open function of valve 84. The knives 74 and 78 will stay open when the air switch is in the off position. Such a remote on-off switch when used, provides remote control to allow the cut-off function to be turned off and/or on while the machine 15 is running. This allows for a cleaner start-up of the packaging machine since the closures can be inspected and adjustments made to obtain the desired integrity before the cut-off function is started. Furthermore, this control can be modified to incorporate a counter so that a preselected quantity of two or more packages may be left interconnected if desired during the operation of the machine 15.

The downward velocity of the package stream $P_1$, $P_2$, etc. produced by the machine 15 is determined by the drop rate of the closure head elevating cams which control the closure head 25. This drop rate controls the velocity of the closure head 25 during the time that it is applying the package closure clips. The speed of the film drive 23 dictates the continuous velocity of the package stream and is set to match the head velocity during the time that the closure clips are being applied so that the cllosure head 25 does not tend to stretch the film (as would occur if the film drive speed is too slow) or to retard the film (as would occur if the film drive speed were too fast). The profile of the cam groove 51 in the motion generating cam 48 is such as to move the knife head 57 downward at or near the same downward velocity as the closure head.

It will be seen from FIG. 1 that the cutting device or severing mechanism 26 is so positioned as to be immediately below the closure head 25. This allows the knife head 57 to sever the package interconnecting film between the clips $C_1$ and $C_2$, preferably as soon as this portion of the package adequately clears the closure head 25. This close placement of the cutter device 26 to the closure head 25 and its clip applying mechanism eliminates or minimizes cutter registration problems that would be caused by film stretch, film drive slippage, or film drive speed drift that would tend to occur if the cutter device 26 was located at a large distance from the closure head 25. Thus, such close placement reduces the magnitude of timing errors between package advance rate and cutter drop rate thereby keeping cuts centered between clips.

It will be apparent that various changes may be made in the cutter device or severing mechanism 26 without departing from the spirit and scope of the invention. For example, a separate cam plate could be provided for actuating the cam follower roller 52 instead of using the periphery of the motion producing cam plate 48. The severing device or cutter mechanism 57 could be electrically actuated and controlled in known manner. A chain drive with a take-up mechanism could be employed to provide the timing function in place of the planetary gear system.

Furthermore, while the chub machine operates to continuously form a web into a tube and continuously extrude product into the continuously moving tube, there are known commercial machines which operate intermittently to form chub type packages. In such intermittent machines, a short length of filled tube is gathered and a pair of spaced clips applied on the gathered tubing. As in the current chub machines, the clip-applying heads of the intermittent machines also incorporate severing mechanism to sever the gathered tubing between each pair of clips. The present invention may also be used to advantage in connection with the intermittent machines and the intermittent operation simplifies the adaptation of the invention to such machines.

What is claimed as new is:

1. In a chub machine for forming chub packages and having, means for continuously forming a web of packaging material into a tube, means for continuously feeding said tube downwardly over a hollow vertical mandrel, means for delivering a flowable product to said mandrel so as to continuously discharge product from the bottom end thereof into said tube, voider means for voiding product from short lengths of said tube at predetermined intervals, vertically reciprocating head means having a passageway through which said tube descends and containing means to gather said short lengths of voided tube and apply a pair of spaced clips to each said gathered length, and means operatively interconnecting said voider means and said reciprocating head means in timed operating relationship, the improvement, comprising: means for severing said gathered tube intermediate said pairs of clips comprising, a shears mechanism in vertical alignment with and below said head means passageway, vertically reciprocable carrier means for said shears mechanism separate from said head means, drive means operatively interconnecting said carrier means and said voider means whereby said carrier means reciprocates in coordination with said head means, and activating means for said shears mechanism for activating the same in coordination with said head means.

2. In the improvement called for in claim 1 control means for said shears mechanism activating means whereby said shears mechanism is actuated to sever said gathered tubing intermediate only certain predetermined of said pairs of clips.

3. In the improvement called for in claim 1 control means for said shears mechanism actuating means operable to activate said shears mechanism when the same is in proximity to said head means.

4. In the improvement called for in claim 1 said carrier means comprising, a pivoting arm pivotably supported adjacent one end for reciprocating pivotal movement in a vertical plane and carrying said shears mechanism at its opposite distal end, a vertical motion generating cam plate having a cam track thereon, and a cam follower roller carried by said pivoting arm intermediate its opposite end in driven engagement with said cam groove, said drive means comprising gear train means operatively interconnecting the drive of said voider means with said motion generating cam plate.

* * * * *

UNITED STATES PATENT AND TRADEMARK OFFICE
CERTIFICATE OF CORRECTION

PATENT NO. : 4,211,051
DATED : July 8, 1980
INVENTOR(S) : Phillip C. Tucker

It is certified that error appears in the above-identified patent and that said Letters Patent are hereby corrected as shown below:

Col. 2, line 35 - Cancel "cutting" and insert -- cutter --.

Col. 3, line 45 - After "appreciable" insert -- relative --.

Col. 4, line 2, After "No." and before "831,302" insert -- 2, --.

Col. 5, line 32 - Cancel "vavle" and insert -- valve --.

Col. 5, line 57 - Cancel "can" and insert -- cam --.

Col. 7, line 14 - Cancel "cllosure" and insert -- closure --.

Signed and Sealed this

Fourth Day of November 1980

[SEAL]

Attest:

SIDNEY A. DIAMOND

Attesting Officer

Commissioner of Patents and Trademarks